(12) United States Patent
Tsui et al.

(10) Patent No.: US 6,347,089 B1
(45) Date of Patent: Feb. 12, 2002

(54) SIMPLIFIED ETHERNET FRAME SWITCHING SYSTEM ARCHITECTURE WITHOUT LOCAL BUFFER REQUIREMENT

(75) Inventors: Tak-Lap Tsui, Sunnyvale; Jun Yu, Milpitas; Lian-Sheng Xie, Fremont, all of CA (US)

(73) Assignee: Advanced Communication Devices Corp., Fremont, CA (US)

( * ) Notice: Subject to any disclaimer, the term of this patent is extended or adjusted under 35 U.S.C. 154(b) by 0 days.

(21) Appl. No.: 09/108,571

(22) Filed: Jul. 1, 1998

Related U.S. Application Data

(60) Provisional application No. 60/051,505, filed on Jul. 2, 1997.

(51) Int. Cl.[7] .............................................. H04L 12/28
(52) U.S. Cl. ...................... 370/425; 370/429; 370/446
(58) Field of Search ................................ 370/352, 389, 370/365, 401, 412, 413, 414, 415, 416, 417, 418, 419, 474, 475, 428, 429, 375, 378, 422, 425, 445, 446

(56) References Cited

U.S. PATENT DOCUMENTS

| | | | | |
|---|---|---|---|---|
| 5,610,905 A | * | 3/1997 | Murthy et al. | 370/401 |
| 5,898,687 A | * | 4/1999 | Harriman et al. | 370/390 |
| 6,088,356 A | * | 7/2000 | Hendel et al. | 370/392 |
| 6,111,876 A | * | 8/2000 | Frantz et al. | 370/392 |

* cited by examiner

Primary Examiner—Chau Nguyen
Assistant Examiner—Inder Pal Mehra
(74) Attorney, Agent, or Firm—Bo-In Lin

(57) ABSTRACT

The present invention includes an Ethernet frame switching system for receiving and transmitting data frames from and to a plurality of ports. The frame switching system includes a plurality of port control units for managing the transmission and reception procedural processes with a physical layer device. The frame switching system further includes a queue management unit (QMU) connected with data buses to the port control unit. The data frames received from or transmitted to the port control unit are managed by the QMU that these data frames received are transmitted directly to and data frame for transmission or retrieved directly from a single shared data frame buffer such that the local data frame buffer is not required in each of the port control units. Without these local data buffers, the QMU applies a novel link list queue management process to complete the writing and reading of data frame for transfer over the data bus in a single time-division multiplexed time slot such that no loss of data frame occurs. The data frame queue management further include a special technique for managing the broadcast frames by employing a broadcast frame counter together with the link list management scheme. The first-in-first-out order is maintained in combination with the unicast frames without requiring multiple data frame storage slots for the broadcasting frames such that high through put of frame switching is achieved without imposing additional memory requirements.

5 Claims, 14 Drawing Sheets

Functional block diagram of a frame switching system of present invention

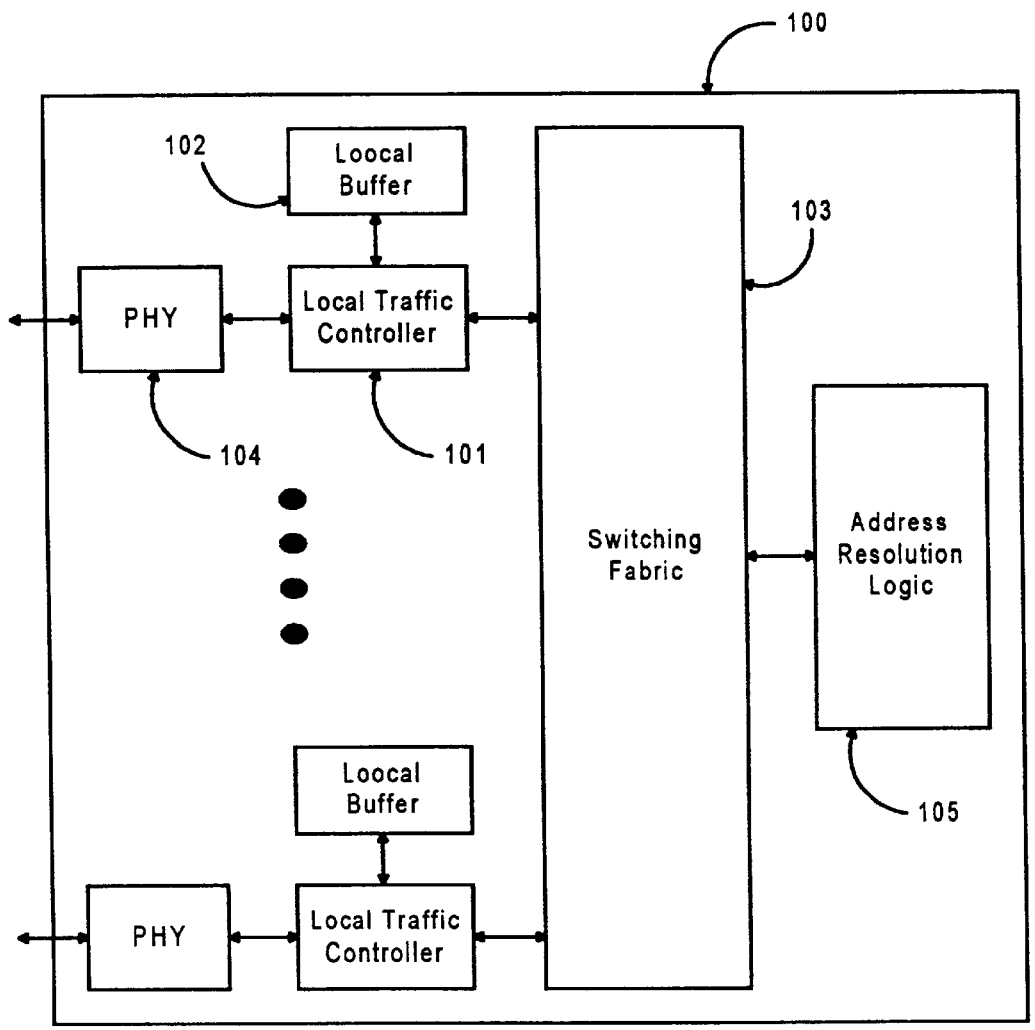
Figure 1. Functional block diagram of a conventional frame switching system (Prior Art)

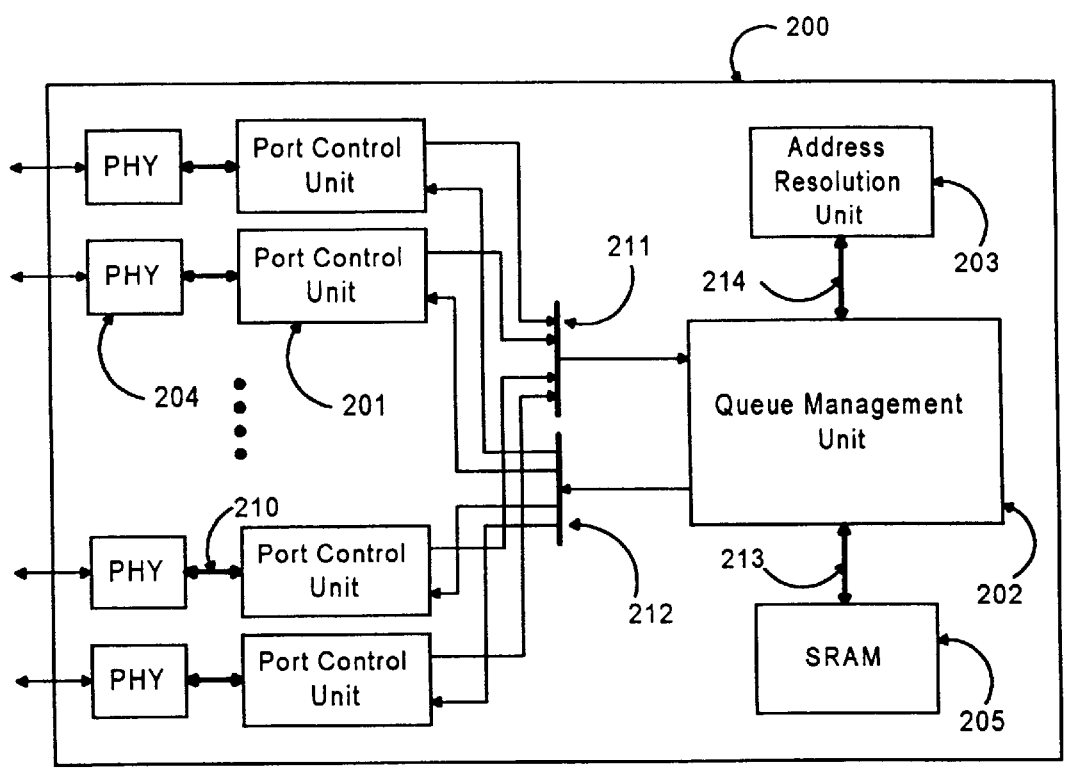
Figure 2. Functional block diagram of a frame switching system of present invention

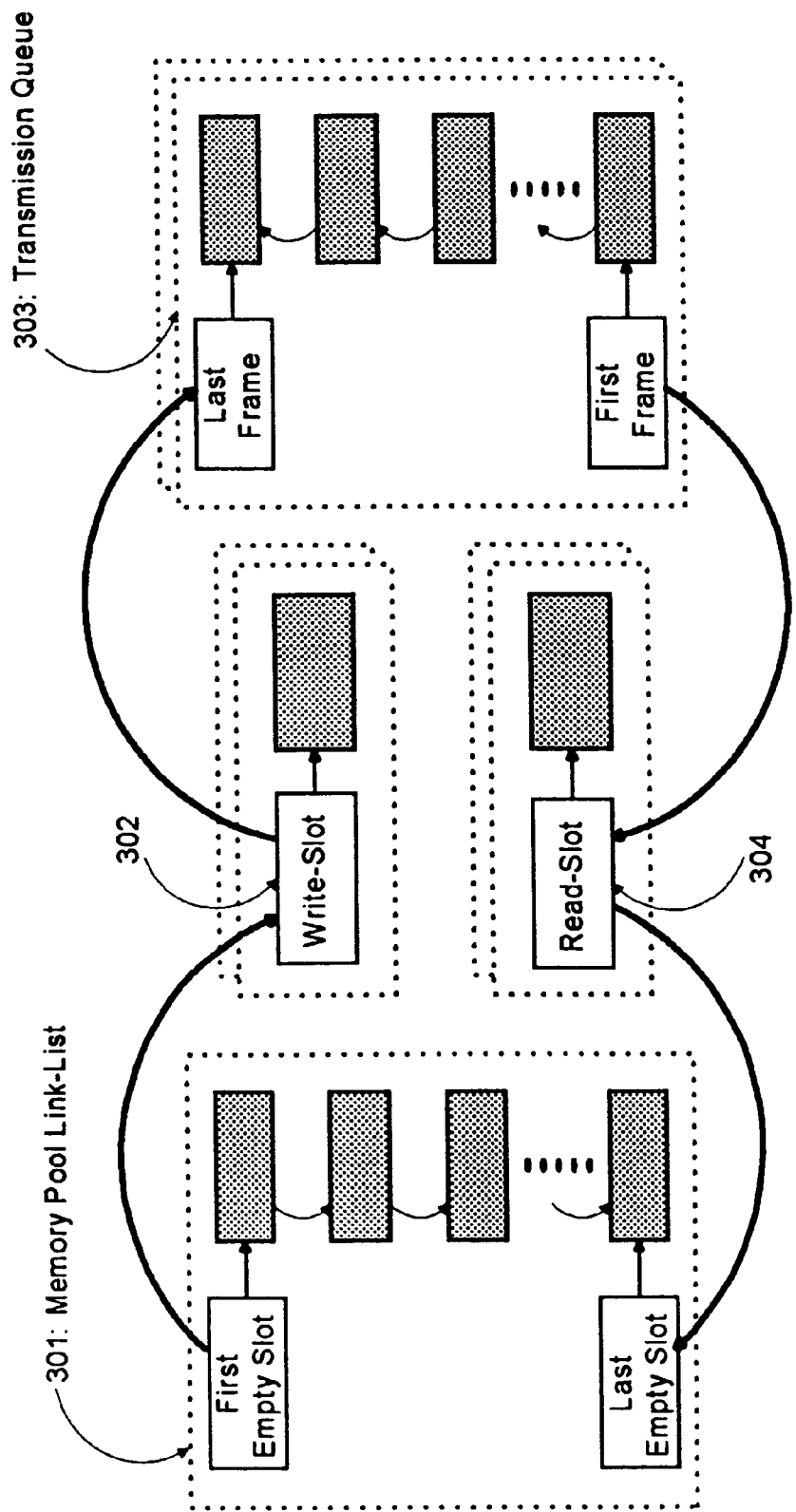
Figure 3. Memory management scheme of present invention

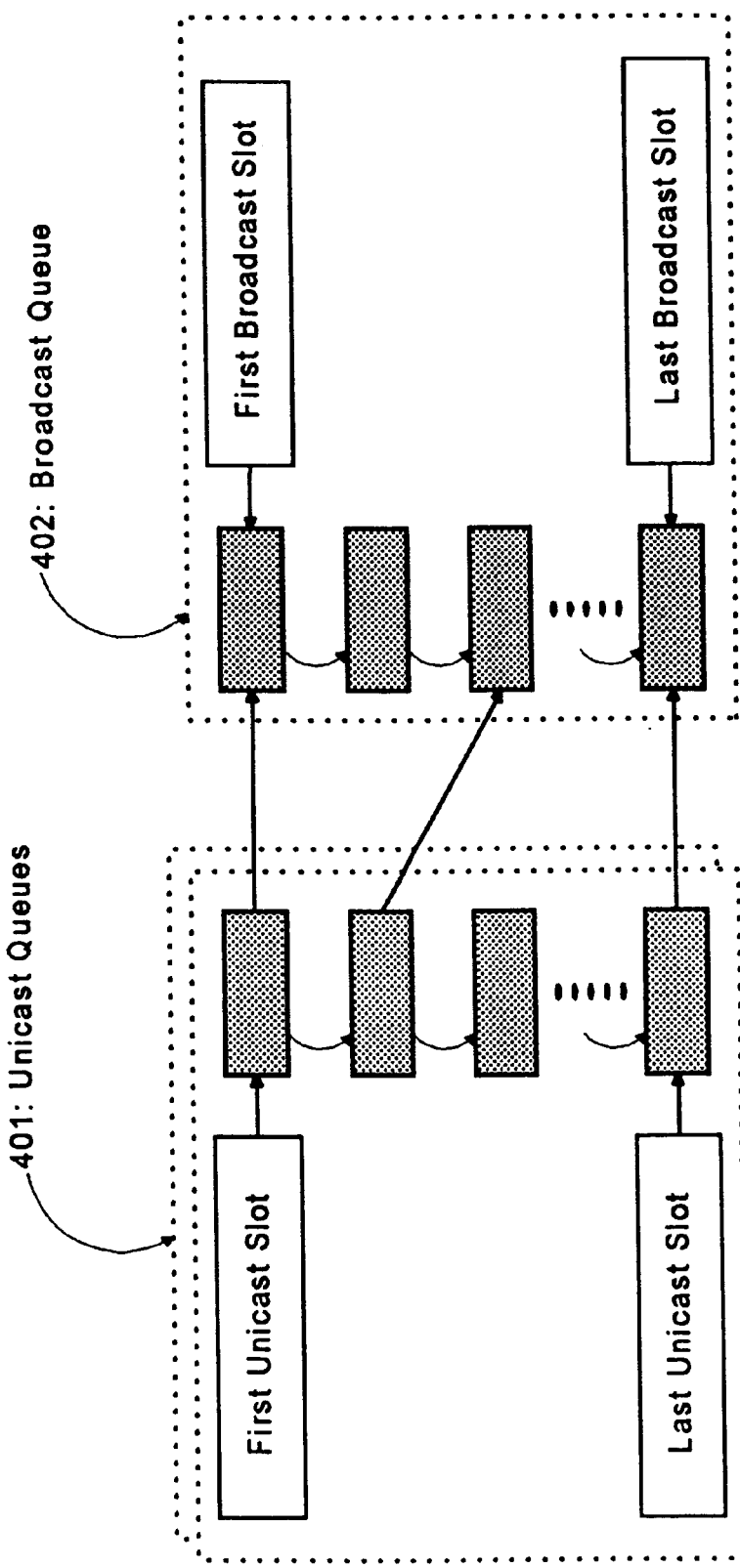
Figure 4. Sequence enforcement scheme of present invention

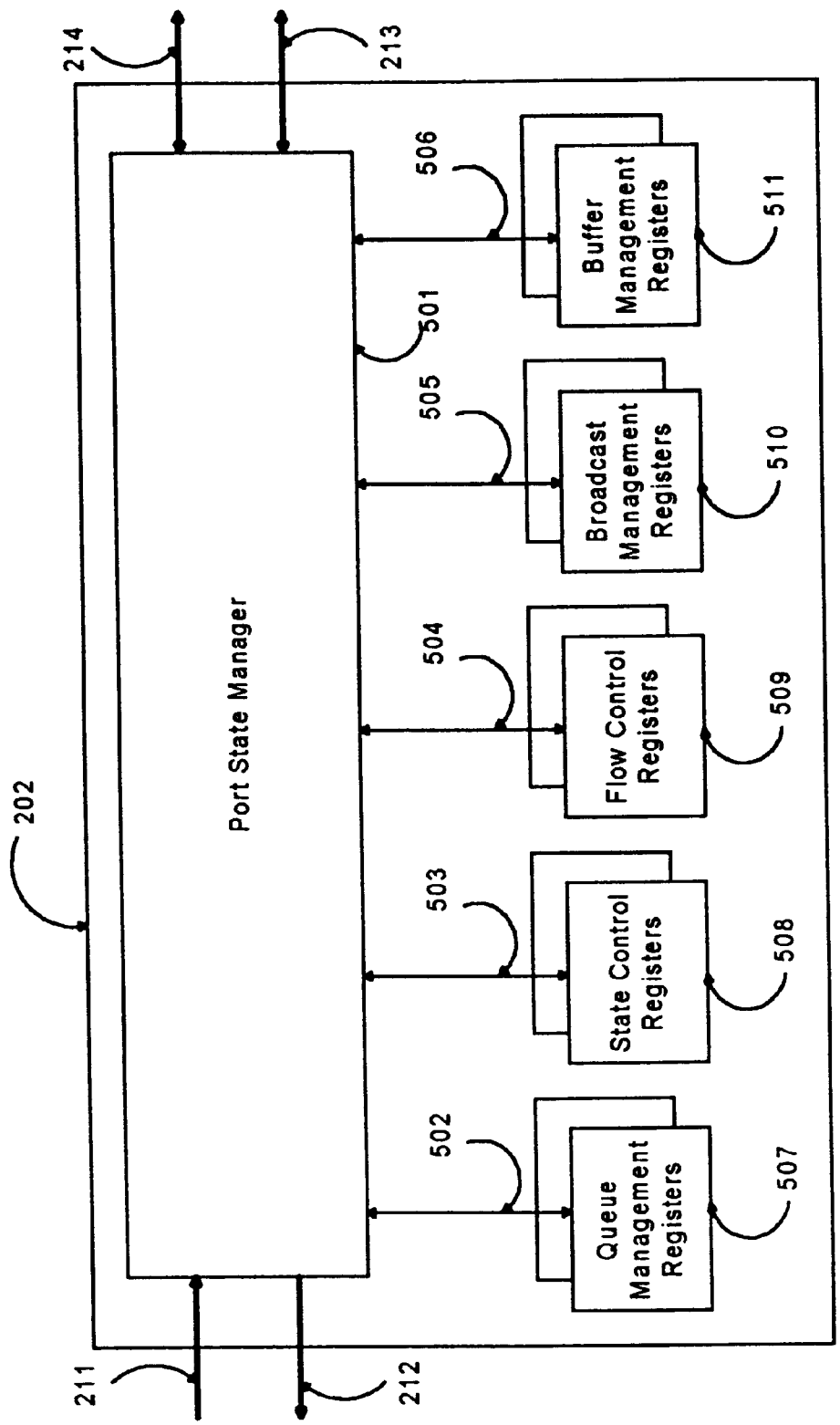
Figure 5. Functional Block diagram of Queue Management Unit

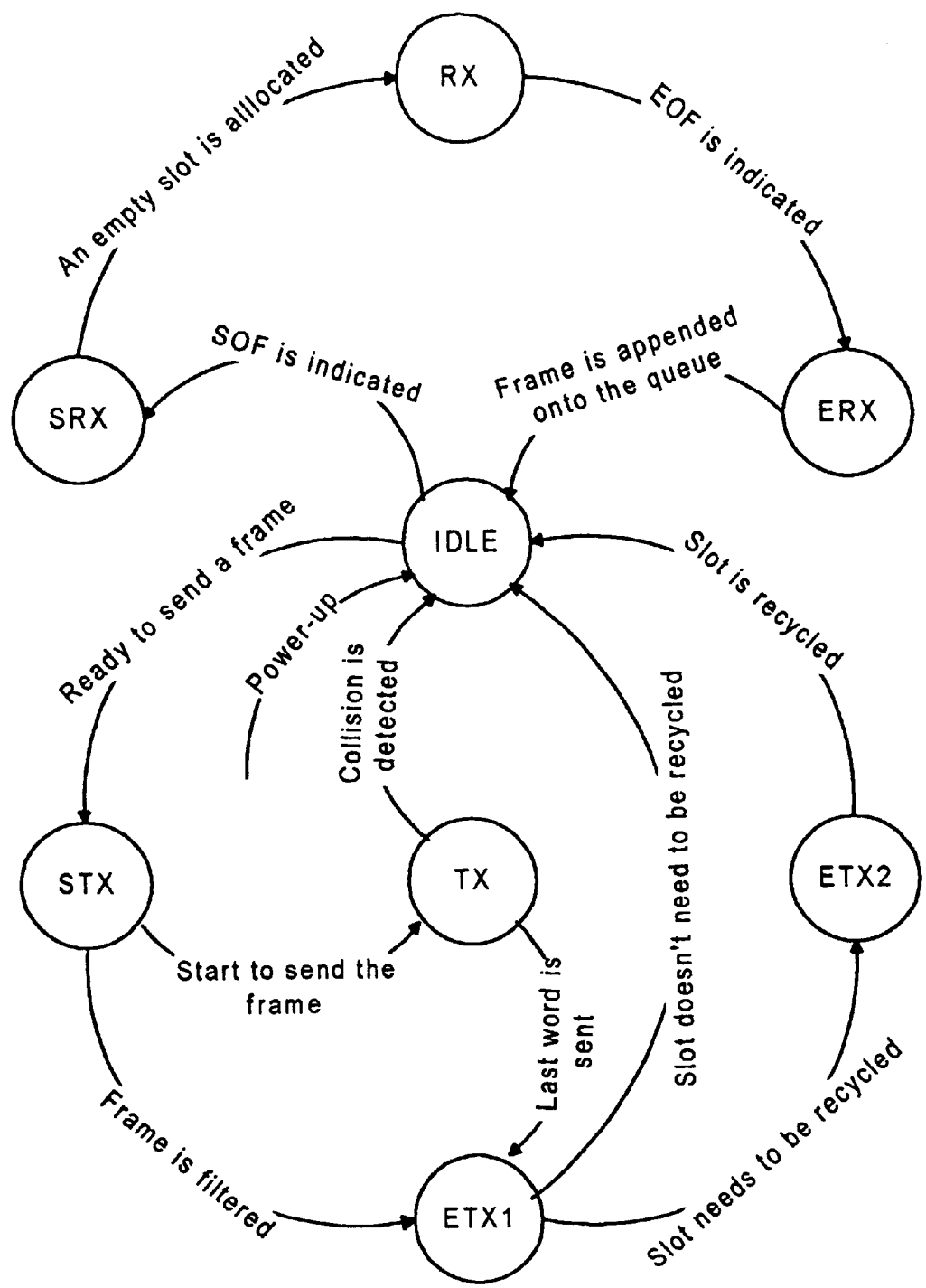
Figure 6. State Diagram Of Port State Manager

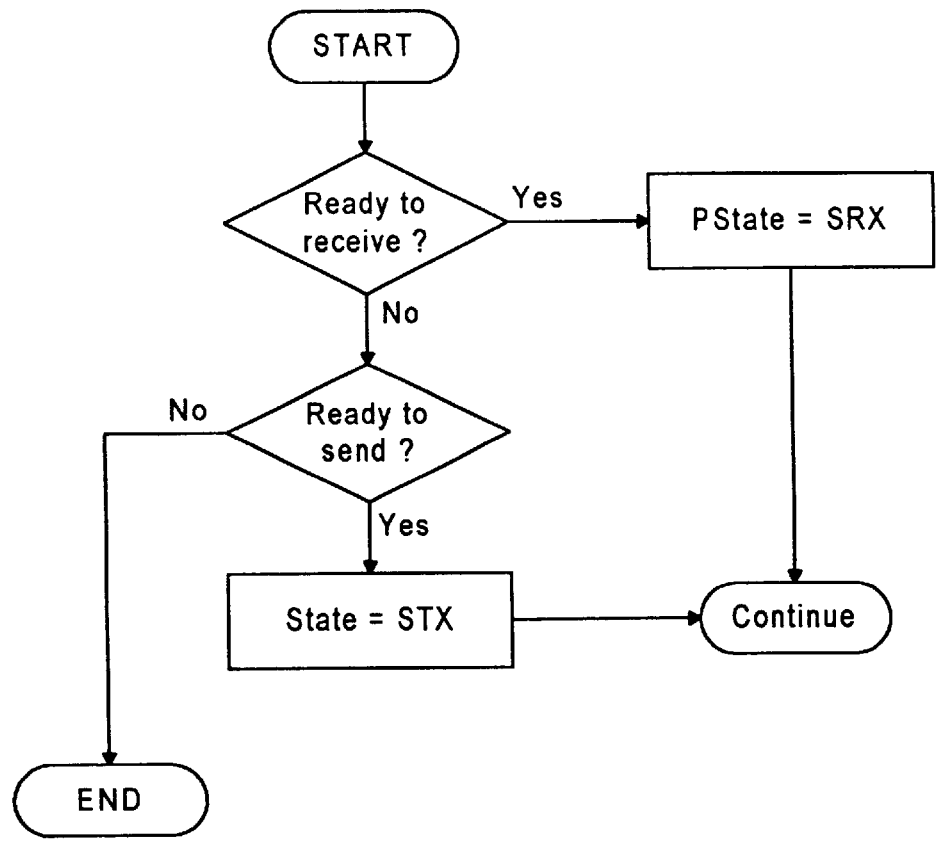
Figure 7. Flow-Chart of activities taken in PSM's IDLE state

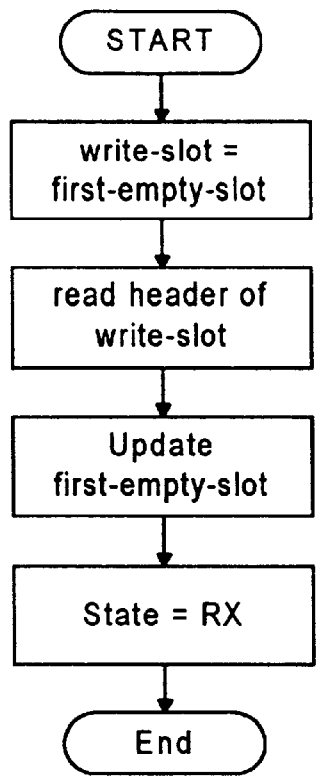
Figure 8. Flow-Chart of activities taken in PSM's SRX state

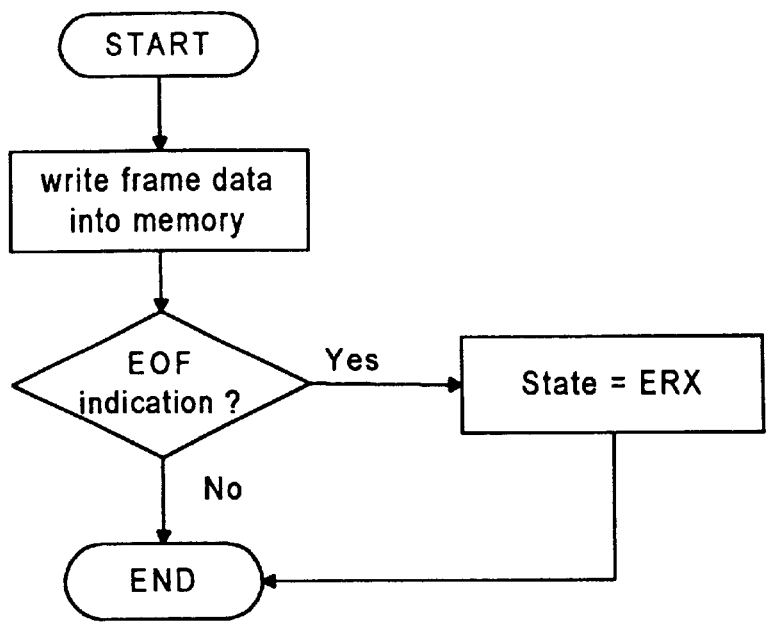
Figure 9. Flow-Chart of activities taken in PSM's RX state

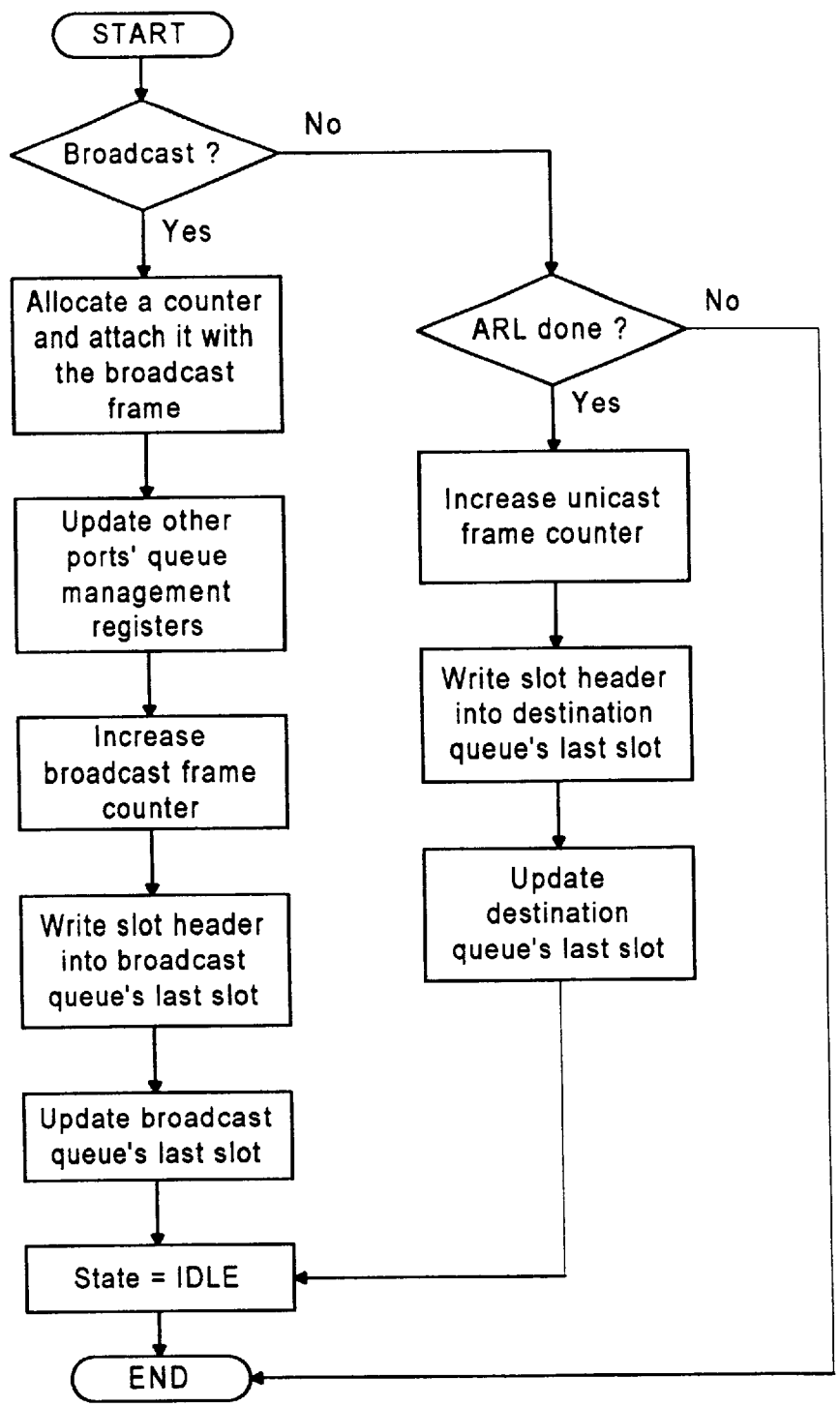
Figure 10. Flow-Chart of activities taken in PSM's ERX state

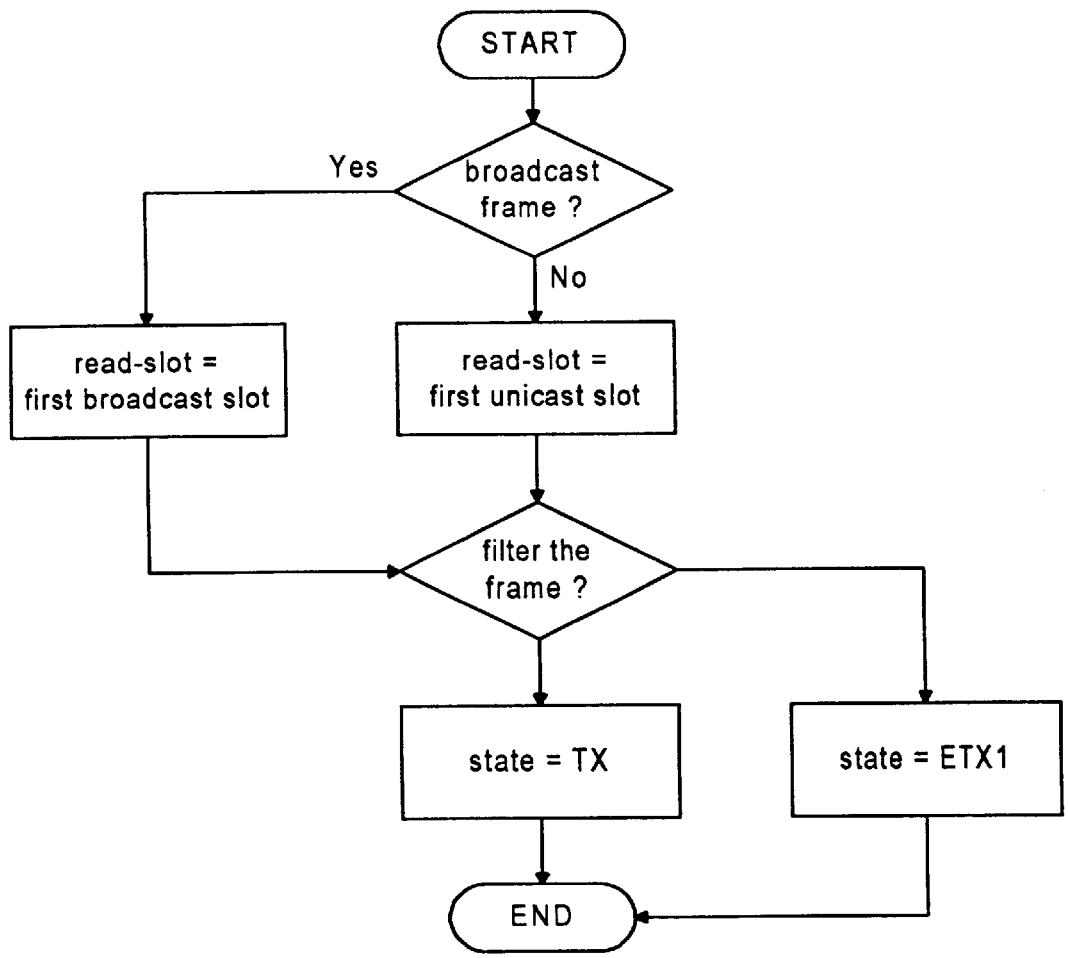
Figure 11. Flow-Chart of activities taken in PSM's STX state

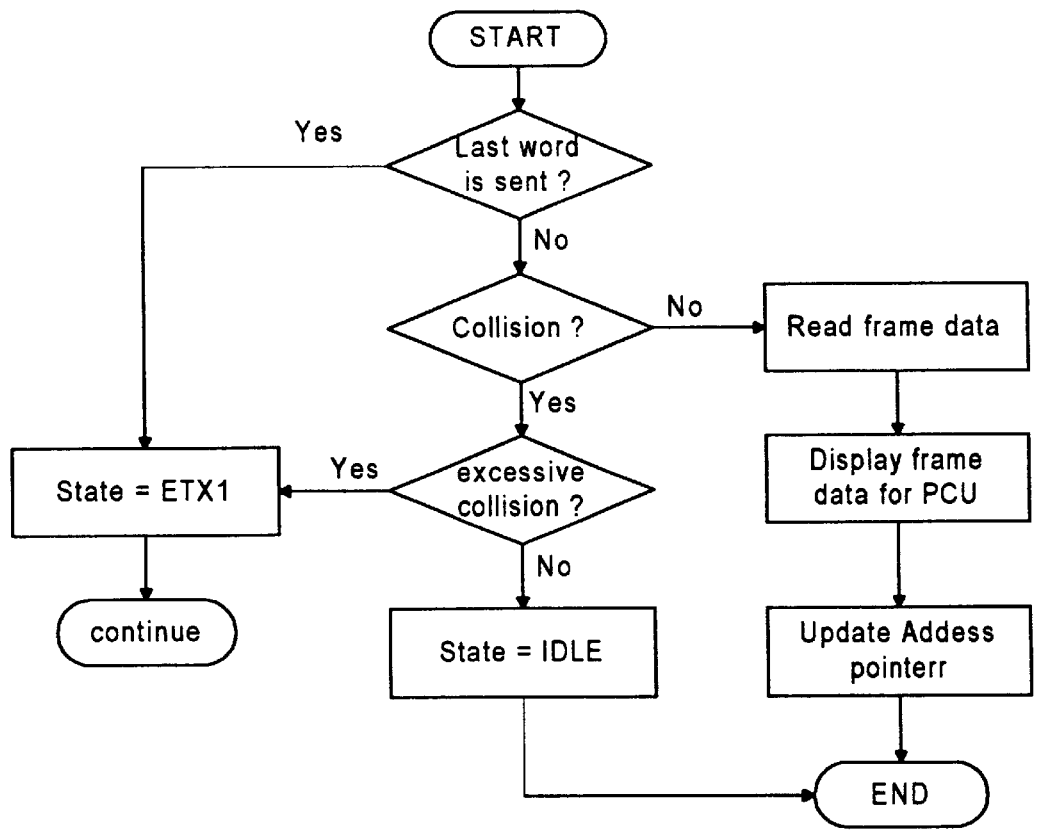
Figure 12. Flow-Chart of activities taken in PSM's TX state

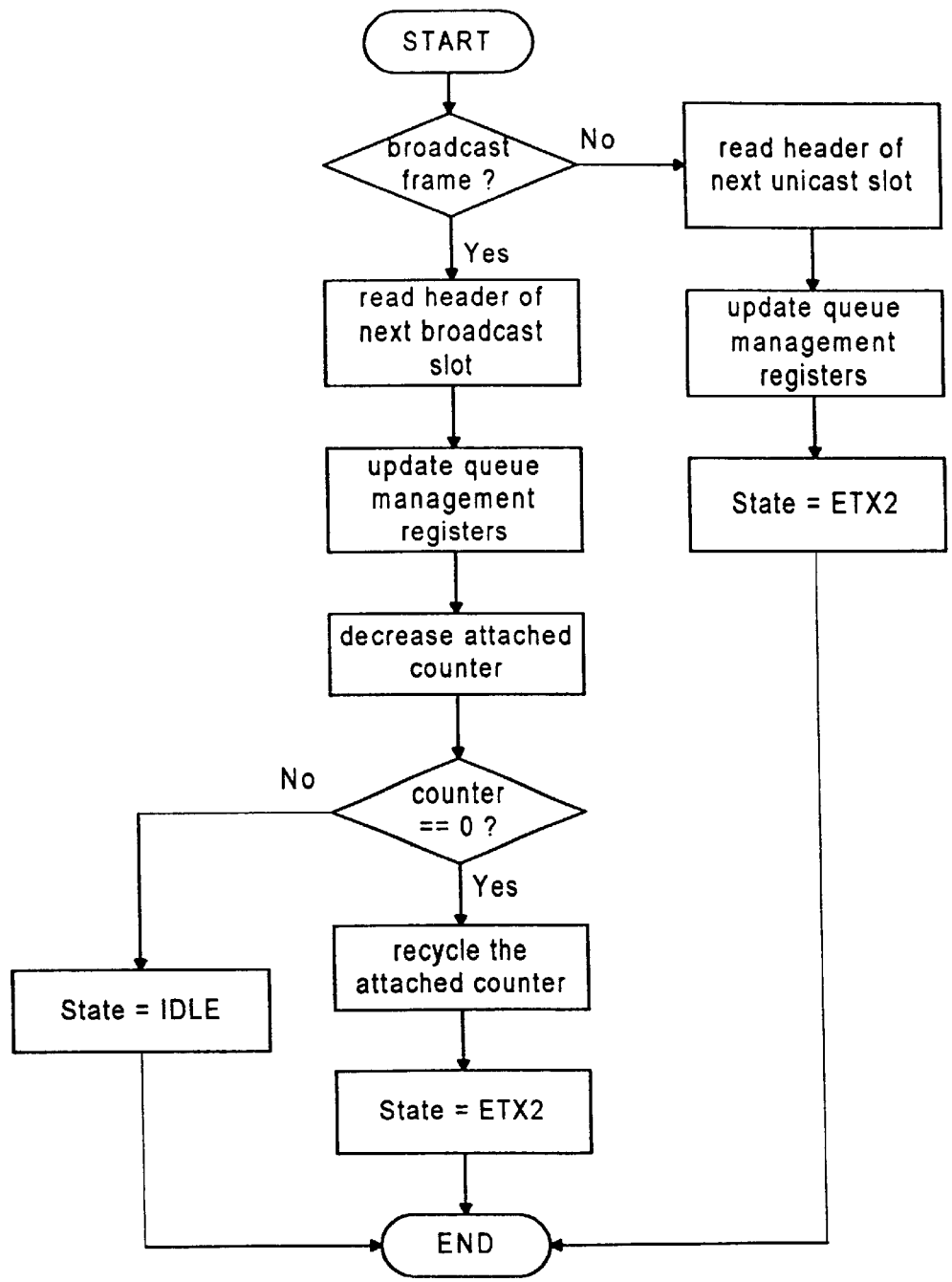
Figure 13. Flow-Chart of activities taken in PSM's ETX1 state

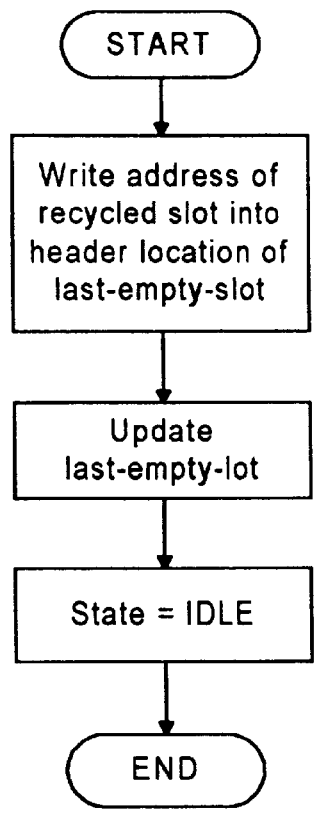
Figure 14. Flow-Chart of activities taken in PSM's ETX2 state

SIMPLIFIED ETHERNET FRAME SWITCHING SYSTEM ARCHITECTURE WITHOUT LOCAL BUFFER REQUIREMENT

This Application claims a Priority Filing Date of Jul. 2, 1997 benefited from a previously filed Provisional Application 60/051,505.

BACKGROUND OF THE INVENTION

1. Field of the Invention

This invention relates generally to the system architecture and data management techniques to configure and design a single chip Ethernet frame switching system. More particularly, this invention relates to an improved system architecture implemented with new techniques of frame data management to reduce the memory requirement on the single chip and to increase the speed of frame switching operations. An Ethernet frame switching system can be built on a single chip with less gate counts while maintaining a high bandwidth switching operation with high port density.

2. Description of the Prior Art

Traditional Ethernet frame-switching systems are designed and manufactured with a technology by storing the incoming data frames into some sort of local buffers before the data frames are forwarded to their destination ports through a switching fabric. This kind of approach usually leads to the application of more complicated frame data management schemes, and requires large number of gate counts for implementing high performance and high port density Ethernet frame switching system. Since the integrated circuits (ICs) designed for conventional Ethernet frame switching system occupy larger areas of silicon wafer, it is difficult to implement a Ethernet frame switching system with high port density and high throughput performance on a single silicon chip to significantly increase the performance/cost ratio.

FIG. 1 shows briefly a system configuration of a conventional Ethernet frame switching system 100. The system is consisted by a set of logical units, wherein each logic unit includes a physical layer device, i.e., PHY 104, a local traffic controllers 101, and a local buffers 102. The frame switching system further includes a switching fabric 103, and a address resolution logic 105. Local traffic controller 101 may contain one or multiple copies of Medium Access Control (MAC) logic circuitry to handle the transmission and reception process of each port. Data frames coming into the frame switching system are forwarded by local traffic controller 101 to their corresponding destination ports through the shared switching fabric 103. Switching fabric 103 can be in the form of a cross-bar switch, a shared bus, or a shared memory. The access to the switching fabric 103 is controlled by an arbitration circuitry to select which local traffic controllers 101 can access the switching fabric. Since the access is arbitrated, there is no guarantee that the data can be forwarded to correspondent destination port within limited time period. Therefore, a conventional frame switching system has to store the ingress data into a local buffer 102 before further processes are carried out to accomplish the switching operations. Local buffer 102 can be in the form of random access memory or deep FIFO. Due to this multiple logic unit architecture and the two tier memories for storing the data frames, more complicated frame data management schemes are required. Integrated circuits of large gate count are employed in order to implement the more complicate data frame management schemes to achieve a high performance and high port density Ethernet frame switching system. Large areas of a silicon wafer are occupied by the integrated circuits thus limiting feasibility in implementing this switching system in a single chip.

Therefore, a need still exists in the art of local area network communication to provide a new and improved system configuration and frame data management techniques for managing the frame switching tasks. It is desirable that an Ethernet frame switching system with high switching throughput performance and high port density can be implemented using limited gate count, whereby the single chip frame switching system can be produced at significant lower cost. In order to reduce the wafer areas occupied by the integrated circuits of the frame switching system, it is further desirable that the local buffer for each port in the switching system can be eliminated. Therefore, the areas occupied by the multiple local buffers for each port are no longer required.

SUMMARY OF THE PRESENT INVENTION

It is therefore an object of the present invention to provide a simplified architecture for an Ethernet frame switching system, designed with assured bandwidth to access the switching fabric, such that the requirement on local buffer of each port can be eliminated and the aforementioned difficulties and limitations in the prior art can be overcome.

Specifically, it is an object of the present invention to provide a simplified architecture for an Ethernet frame switching system by directly writing the incoming data into a shared memory buffer from all the ports and applying a more effective and streamlined global frame management process such that the difficulties of the conventional two-tier memory storage configuration can be overcome.

Another object of the present invention is to provide a simplified architecture for an Ethernet frame switching system without requiring a local buffer for each port by employing a shared global memory for all the ports and applying a more effective and streamlined global frame management process such that the gate count of the switching system can be reduced with less silicon wafer areas occupied by the frame switching system to allow single chip integration of a high performance and high port density frame switching system.

Another object of the present invention is to provide a simplified architecture for an Ethernet frame switching system without requiring a local buffer for each port by employing a shared global memory for all the ports and applying a more effective and streamlined global frame management process such that the system throughput performance can be improved without requiring the use of device of higher clock rate whereby switching device of high performance, high port density and low cost can be achieved.

Another object of the present invention is to provide a simplified architecture for an Ethernet frame switching system with assured bandwidth for all the ports and applying a more effective and streamlined global frame management process such that the throughput of the system is truly non-blocking under any kind of traffic load, and the forwarding rate of the system can be wire speed.

Briefly, in a preferred embodiment, the present invention includes an Ethernet frame switching system for receiving and transmitting data frames from and to a plurality of ports. The frame switching system includes a plurality of port control units for managing the transmission and reception procedural processes with a physical layer device. The frame switching system further includes a queue management unit (QMU) connected with data buses to the port control unit. The data frames received from or transmitted to the port control unit are managed by the QMU that these data frames received are transmitted directly to and data frame for transmission or retrieved directly from a single shared data frame buffer such that the local data frame buffer is not required in each of the port control units. Without these local data buffers, the QMU applies a novel link list queue management process to complete the writing and reading of data frame for transfer over the data bus in a single time-division multiplexed time slot such that no loss of data frame occurs. The data frame queue management further includes a special technique for managing the broadcast frames by employing a broadcast frame counter together with the link list management scheme. The first-in-first-out order is maintained in combination with the unicast frames without requiring multiple data frame storage slots for the broadcasting frames such that high through put of frame switching is achieved without imposing additional memory requirements.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 is a functional block diagram of an Ethernet frame switching system according to a conventional prior art design;

FIG. 2 is a system block diagram of an Ethernet frame switching system of the present invention;

FIG. 3 is a functional block diagram for illustrating the memory management scheme employed by the present invention for frame switching operations;

FIG. 4 is a functional block diagram of the queue management unit (QMU) of the present invention;

FIG. 5 is a state diagram of a port state manager of the QMU in the process of handling the frame switching operations;

FIGS. 6 to 14 are flow charts for describing the functional steps performed by the port state manager in carrying out the frame switching tasks during different states of each port.

DETAILED DESCRIPTION OF THE PREFERRED EMBODIMENT

Please refer to FIG. 2 for a system block diagram of a Ethernet frame switching system 200 for illustrating the data flows of the present invention. In the preferred embodiment, the frame switching system 200 includes twenty four Port Control Units 201 (PCUs), one Queue Management Unit 202 (QMU), one Static Random Access Memory (SRAM) buffer 205, and one Address Resolution Logic 203 (ARL). Frame data from the network media is recovered by external physical layer devices 204 (PHY) into their original digital format. The recovered data is forwarded to the PCU 201 through data bus 210, nibble by nibble. The nibble-wide binary data received via bus 210 is converted into parallel form of 48-bit wide data words. Additionally, each PCU contains a Medium Access Control (MAC) logic to handle the transmission and reception processes according to the CSMD/CD scheme specified by IEEE 802.3 standard, an industry standard commonly applied by those of ordinary skill in the art, and other necessary logic functions associated with each individual port.

PCU 201 of this invention is to implement all medium access control (MAC) functions for each port's reception and transmission processes. Unlike the local traffic controller 101 of the prior art, there is no local buffer in PCU 201 for storing the incoming bit streams. PCU 201 of this invention contains a shift register, a data register, a start of frame detector (SFD), a Frame Check Sequence (FCS) verification logic, a timer for timing control of deferring process, a timer for timing control of back-off algorithm, and a counter to count the length of a frame. The shift register is used to convert the received data from serial bit stream into parallel form data words, and to convert the transmitted data words from parallel form into serial bit stream. The data register is used as a synchronization buffer to synchronize the serial data from data bus 210 with the parallel data on bus 211 or bus 212. Data bus 211 and 212 connects plurality of PCUs with QMU.

The received data in 48-bit wide words, together with various status signals, are transferred in parallel form, from plurality of PCU 201 to QMU 202 through bus 211. Bus 211 is accessed by each individual PCU in a time division multiplexing manner. Data words sent over bus 211 according to the time division multiplexing scheme are written into the memory by the QMU 202, together with valid address signals and read/write control signals, through bus 213. When a PCU needs to transmit a frame, its time slot is used to retrieve frame data stored in the SRAM buffer 205. The data is read out through bus 213, and is then forwarded to the transmitting PCU through bus 212. The transmitting PCU converts the 48-bit data word into 4-bit wide data stream, and forwards the bit stream to the external PHY device through bus 210.

Basically, the switching function is managed by the cooperation between plurality of PCU 201 and QMU 202. Each PCU 201 controls the transmission and reception processes of each individual port. For receiving, while a PCU 201 receives frame data from an external PHY device and applies its pre-allocated time slot to display the received data and the associated status signals onto the synchronous bus 211, QMU 202 monitors bus 211 continuously and controls the data flow to the SRAM buffer 205. For transmitting, when a PCU 201 signals the QMU 202 that it is ready to transmit a frame, QMU 202 reads the data of the first frame in the port's transmission queue from the SRAM buffer 205 and displays the read data on the synchronous bus 212. The PCU 201 receives the data from bus 212, converts the parallel data into serial form, and forwards the data to the external PHY device through bus 210. Since the data paths between QMU 202 and plurality of PCU 201 are accessed by each PCU in time division multiplexing manner, the switch function has to be completed expeditiously within the time slot allocated for each port. Unlike the switching operations performed by a conventional switching system, since there are no local buffers to store the incoming signals, the switching system, particularly the QMU 202, must complete the required operations of data transfer between the shared memory 205 and the port control unit 201 within the time slots allocated for each port to prevent data loss. The QMU 202 must manage the switching mechanism more effectively in order to process multiple asynchronous traffics from all ports simultaneously. Detail functions performed by the QMU will be described below. At the end of an ingress frame, PCU 201 indicates the End Of Frame (EOF) condition of the reception process through a status signal.

FIG. 3 shows the sequence and method for managing the writing and reading of data to and from the shared SRAM buffer 205. Frames coming from all ports are stored into one shared SRAM buffer 205. The memory pool is divided into slots of fixed size, e.g., 1536 bytes, and is managed by a link-list logic scheme. When a frame comes through a port, an empty slot from the memory pool 301 is dynamically granted to the ingress port as a write slot 302. This write slot 302 is appended to the transmission queue 303 as the last frame to be transmitted. The granted slot 302, after it is appended to the transmission queue 303 is waiting in line for transmission to a destination port in the transmission queue 303. At the time when the granted slot 302 becomes a first frame for transmission, it is designated as the read slot 304. After the message stored therein is read to the destination port, it is recycled back into the memory pool as the last empty slot. The memory management scheme for the broadcast frame is slightly different from that of the unicast frames. For each broadcast frame, in addition to a memory slot, a hardware counter is dynamically allocated and attached with the frame. The counter is employed to record the number of destination ports which are designated to receive this broadcast frame. The count is reduced by one when a broadcast message is sent to one of the designated ports. Once a slot is used to store a broadcast frame, it is temporarily prevented from being recycled back into the memory pool until all the destination ports have transmitted the broadcast frame, i.e., when the count stored in the broadcast port counter is reduced to zero.

In order to enforce the first-in-first-out order for all the incoming frames, the frame switching system has to maintain a record for the sequence of arrival for all frames. The order of all unicast frames (frames designated for a single port) are automatically enforced. Since the unicast frames received are appended onto the corresponding transmission queues in a first-come-first-serve manner, the order each slot is arranged in the transmission queue 303 according the sequential order of reception for each frame of each individual port. All broadcast frames waiting to be transmitted are lined up into a separate single broadcast queue. The sequence of all unicast frames in multiple independent transmission queues with respect to the broadcast frames in the broadcast queue is recorded by the slot headers of these frame slots. A location, for example, the first 6-byte of each memory slot, is reserved to store the slot header information of next slot in the queue. The slot header of a unicast frame stores the information about the address of the slot containing the unicast frame, the length of the unicast frame, the address of the slot containing the first broadcast frame relative to this unicast frame, the length of the first broadcast frame, the index of the counter attached with the first broadcast frame, the identification of the source port which receives the first broadcast frame, and the number of broadcast frames to be transmitted before this unicast frame. The slot header of a broadcast frame is used to store the information about the address of the slot containing the broadcast frame, the length of the broadcast frame, the index of the counter attached with the broadcast frame, and the identification of the source port which receives the broadcast frame.

Referring again to FIG. 3 for the memory management scheme of the present invention. When a new frame is received by a port, a write-slot-pointer is assigned to point to an empty memory slot allocated for the source port. In the beginning of a receiving process, the value of the write-slot-pointer is converted into an starting memory address and is loaded into the address-pointer of the port. The received data is then stored into the memory buffer directly. The receiving process continues as long as data of the same packet (frame) comes in. At the end of a receiving process, if this is a unicast type frame, the slot header of this frame is written into the reserved header location of the last slot in the transmission queue of the destinations port; if this is a broadcast type frame, the slot header of this broadcast frame will be written into the reserved header location of the last slot in the transmission queue of broadcast frames.

Referring again to FIG. 3, when a port is ready to send a frame designated to it, the data of the frame is read from the memory slot pointed by the port's read-slot-pointer. In the beginning of a transmission process, the value of the read-slot-pointer is converted into an memory address and is loaded into the port's address-pointer. The frame data is then read out from the memory buffer according the sequence listed in the transmission queue 303 based on the link list operation described above, one word at a time. At the end of a transmission process, the memory slot is recycled back to the memory pool 302 after the frame is transmitted to all designated ports.

FIG. 4 is an illustration of scheme of how to enforce the sequence of all broadcast frames lined up in a broadcast queue 402 with respective to the unicast frames lined up in the unicast queue 401 in each port's transmission queue. The header of each unicast frame provides information about the first broadcast frame, and the number of broadcast frames arrived before the unicast frame. During the transmission process, QMU 202 will determine which frame to be sent first, according to the header information stored in the unicast slot. Transmission of the broadcast frames will be carried out first if the broadcast frames are received before the unicast frame according to a first-come-first-serve basis. Application of this link list frame management scheme for prioritizing the transmission of the unicast and broadcast frames alternately as described above has several advantages. A separate buffer for each destination port is no longer necessary to register the broadcast frames designated for that port. Savings of memory space and reduction of IC areas on a silicon wafer are achieved. Higher through-put is also achieved because simplified operations by copying data according to memory address pointers. Complicate memory access operations to read/write data from and to several memory buffers as that required in the conventional system are no longer necessary. Higher speed of data frame switching can be accomplished because of simplified data frame management scheme for the unicast and the broadcast frames.

The major functions performed by QMU 202 are to provide the service to source PCU 201, i.e., receiving PCU 201, to store the data received by PCU 201 into the SRAM buffer 205, and to provide the service to the destination PCU 201, i.e., the transmitting PCU 201, to transfer the data to be transmitted from the memory buffer 205 to the destination PCU 201. The time of service provided by QMU to each PCU is evenly distributed in a time division multiplexing manner. Each PCU is assured to have one time slot to forward the received data to QMU 202 or to retrieve the transmitted data from QMU 202 for a fixed time period, for example, 48 bit times. As that shown in FIG. 3, three major tasks are performed by QMU 202 in the process of receiving an incoming frame. Namely, these three functional steps are 1) allocating an empty memory slot; 2) writing the data into the memory slot; and 3) appending the received frame to the transmission queue of the corresponding destination port for lining up the frame in the right order for transmission to the destination port. In a similar way, in the process of transmitting a frame to its destination port, QMU performs three tasks, including 1) pointing to the memory slot of the transmitted frame; 2) reading the data from memory and sending the data to the destination PCU 201; and 3)

de-allocate the memory slot by appending the address of that slot to the end of the link-list of the memory pool.

According to FIGS. 2 to 4 and the above descriptions, this invention discloses an Ethernet frame switching system. The frame-switching system is for receiving data frames from a plurality of ports each is designated as source port, and transmitting each of the data frames to one of the ports each is designated as a destination port The frame-switching system includes a plurality of port control units (PCUs) for controlling a reception and a transmission of the data frames for each of the ports. The frame-switching system further includes a shared data memory for storing the data frames therein. The frame-switching system further includes a queue management unit (QMU) connected between the PCUs and the data memory. The QMU is applied for transmitting the data frames from one of the PCUs of the source port directly to the shared data memory. And, the QMU is applied for managing a link-list queue for retrieving the data frames from the shared data-memory and to transmit, via one of the PCUs, directly to the destination-port In a preferred embodiment, the QMU managing the link-list for a memory pool link-list of a group of unicast data-frames and a memory pool link-list of a group of broadcast data-frames. In another preferred embodiment, the QMU managing a first data-bus connected to the PCUs and a second data-bus connected between the QMU and the shared data memory for a data-frame reading/writing operation between the PCUs and the shared data memory in a single time-division multiplexed time slot FIG. 5 is a functional block diagram which shows the major functional blocks of QMU 202. QMU 202 includes a plurality of data registers served essentially as pointers, counters, and status records. The registers are grouped into queue management registers, state control registers, flow control registers, broadcast management registers, and buffer management registers. Each port has its own register groups. Referring to FIG. 5 for a functional block diagram of the QMU 202, queue management registers are used to manage the transmission queue of each individual port. Information such as the address of the first slot in the queue, the address of the last slot in the queue, and the slot header of first unicast frame are stored in queue management registers. State control registers are used to manage the state of each individual port. Information such as write-slot-pointer, read-slot-pointer, address- pointer, and port state are stored in state control registers. The flow control registers are used to manage the traffic flow of the frame switching system. Information such as how many broadcast frames are stored in the memory buffer and how many unicast frames are stored in each transmission queue are stored in flow control registers. The broadcast management registers are used to manage the queue of the broadcast frames from all ports. Information such as the address of the first slot in the broadcast queue, the address of the last slot in the broadcast queue, the index of first counter, and the index of the last counter are stored in broadcast management registers. The buffer management registers are used to manage the link-list of the memory pool of the frame switching system. Information such as the address of the first empty slot and the address of the last empty slot are stored in buffer management registers.

Referring to FIG. 6 for a state diagram of the state management logic, referred as port state manager. While there is no activity on a port, the state manager of such port will be in an idle (IDLE) state. In each receiving process, the port state manager may be in a start of receiving state (SRX), a receiving state (RX), or an end of receiving state (ERX). In each transmitting process, the port state manager may be in a start of transmitting state (STX), a transmitting state (TX), an end of transmitting phase one state (ETX1), or a end of transmitting phase two state (ETX2). At each state, the QMU performs a series of data management steps to accomplish specific tasks in order to carry out the frame switching operations. FIGS. 7 to 14 are flow charts to show these functional steps carried out by QMU in each state.

Referring to FIG. 7 for a flow chart of the port state manager in IDLE state. In this state, if the first 48-bit word of the received frame is displayed on bus 211, the state of the port changes to SRX. If the transmission queue of the port is not empty, and the PCU 201 is ready to transmit a frame, the state of the port changes to STX. Otherwise, the state of the port remains at IDLE.

Referring to FIG. 8 for a flow chart of the port state manager in SRX state. In this state, the address of the first empty slot in the memory pool link-list is assigned to the write-slot-pointer of the receiving port, and the slot header of such empty slot is read out to update the first-empty-slot pointer of the link-list. The state of the port then changes to RX.

Referring to FIG. 9 for a flow chart of the port state manager in RX state. In this state, the data displayed on bus 211 will be written into the SRAM buffer 205. If the End Of Frame (EOF) condition is indicated by the receiving PCU 201 through the status signal lines in bus 211, the state of the port changes to ERX.

Referring to FIG. 10 for a flow chart of the port state manager in ERX state. In this state, depends on the received frame is a unicast or broadcast frame, the address of the memory slot which stores the received frame is appended onto the destination port's transmission queue or to the broadcast queue. If the received frame is of broadcast type, the counter pointed by the first counter is allocated and attached with this broadcast frame, and the first counter is updated. The header information of this broadcast frame is then displayed on bus 502 which connects plurality of queue management registers of each port. For ports which have not loaded their first broadcast registers, the information of slot address, frame length and counter index of the broadcast frame will be loaded into the first broadcast slot address register, first broadcast frame length register and first broadcast counter index register respectively, and the broadcast frame counters of these ports are set to 1. For ports which have loaded their first broadcast registers, only the broadcast frame counters are incremented by one. The slot header of this broadcast frame is then written into the reserved header space of the last slot in the broadcast transmission queue. The value of the write-slot-pointer of this receiving port is written as the slot address of this broadcast frame. The header information of a broadcast frame also includes length of this frame, and the index of the counter attached with this frame. If the received frame is a unicast frame, a destination port is identified by the Address Resolution Logic (ARL) 203, according to the destination address embedded inside the frame data. The header information of this unicast frame is written into the reserved header space of the last slot in the destination port's transmission queue. The value of the write-slot-pointer of the receiving port is written as the slot address of this unicast frame. The header information of a unicast frame also includes length of this frame, slot address of first broadcast frame, length of first broadcast frame, index of the counter attached with first broadcast frame, and number of broadcast frames. After the slot header of a received frame is written into the header space of the last memory slot in the transmission queue, the receiving process is completed and the state of the port is changed to IDLE.

Referring to FIG. 11 for a flow chart of the port state manager in STX state. In this state, port state manager starts a transmission process by determining which frame to sent. If the broadcast frame counter is not zero, the frame identified by the first broadcast slot will be transmitted first. Otherwise, the first unicast frame in the port's transmission queue will be sent. After the port state manager has determined which frame to send, the state of the port is changed to TX. FIG. 12 is a flow chart of the port state manager in TX state. In this state, the data of the frame being transmitted is read from the SRAM buffer 205 and is forwarded to the destination PCU 201, one word at a time. After the last word of the frame has been forwarded to PCU 201, the state of the port changes to ETX1. FIG. 13 is a flow chart of the port state manager in ETX1 state. In this state, if the transmitted frame was a broadcast frame, the counter attached with this broadcast frame is decreased by one. The header information of next broadcast frame is read out to update the associated queue management registers. If the attached counter of a broadcast frame reaches zero, or if the transmitted frame was a unicast frame, the state of the port changes to ETX2 to recycle the slot containing the transmitted frame back into the memory pool. If no slot to recycle, the state of the port changes to IDLE. FIG. 14 is a flow chart of the port state manager in ETX2 state. In this state, port state manager writes the address of the memory slot being recycled into the slot header location of the last empty slot in the memory pool link-list. The state of the port then changes to IDLE.

As described above, during a receiving process, the port state manager takes one extra cycle to get an empty memory slot from the memory pool in order to store the received frame data, and another extra cycle to append the received frame onto the corresponding transmission queue. Since there is a minimum inter-frame-gap of 96 bit times (2 bus access cycles) between adjacent Ethernet frames, wire speed receiving is achievable by the disclosed algorithm.

As described above, during a transmitting process, the port state manager takes one extra cycle to update the slot header registers and another extra cycle to recycle the used memory slot back into the memory pool. Since Ethernet frames have to be transmitted with minimum inter-frame-gapof 96 bit times, wire speed transmission is achievable using the disclosed algorithm. Therefor, the frame switching system of this invention can provide each port with an assured bandwidth to access the shared memory buffer under any traffic condition. The improved data storage and retrieval techniques performed in a multiplexing time division manner enable the elimination of a local buffer commonly used by a conventional frame switch system.

Therefore, a simplified architecture for an Ethernet frame switching system is provided wherein the local buffer requirement for each port is eliminated, and the throughput performance of the switching system is improved. Specifically, a simplified architecture for an Ethernet frame switching system without requiring a local buffer for each port is provided by employing a shared global memory for all the ports and by applying a more effective and streamlined global frame management process. The complexities caused by the conventional two-tier memory storage configuration are eliminated. The gate count of the switching system can be reduced with less area of silicon wafer occupied by the switching system to allow higher port density system integration. The switching throughput is improved without requiring the use of device of higher clock rate whereby switching device of high performance and low cost is produced.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An Ethernet frame switching system for receiving data frames from a plurality of ports each is designated as source port and transmitting each of the data frames to one of said ports each is designated as a destination port, comprising:

a plurality of port control units (PCUs) for controlling a reception and a transmission of said data frames for each of said ports;

a shared data memory for storing said data frames therein;

a queue management unit (QMU) connected between said PCUs and said data memory for transmitting said data frames from one of said PCUs of said source port directly to said shared data memory; and said QMU further includes a queue management register for each of said ports for managing a link-list queue by directly appending a frame to a transmission queue of a destination port in said shared data memory for sequential queuing a frame for transmitting via one of said PCUs from said destination port.

2. The Ethernet frame switching system of claim 1 wherein:

said QMU further includes a broadcast management register for each of said ports for managing an address of a first and a last slots in a broadcast queue and a broadcast counter for a broadcast frame for sequentially queuing and transmitting a broadcasting frame.

3. The Ethernet frame switching system of claim 1 wherein:

said QMU further includes a state control register for each of said ports for managing an address of a write-slot-pointer, an address of a read-slot pointer, address pointer and a state of each of said ports.

4. The Ethernet frame switching system of claim 1 wherein:

said QMU further includes a flow control register for each of said ports for registering and managing numbers of unicast frames and broadcast frames stored in a transmission queue of each of said ports for controlling a traffic flow through each of said ports.

5. The Ethernet frame switching system of claim 1 wherein:

said QMU further includes a buffer management register for each of said ports for registering an address of a first empty slot and an address of a last empty slot for managing a link list of a memory pool.

* * * * *